Nov. 20, 1934.  P. STAPP  1,981,676
APPARATUS FOR THE PRODUCTION OF SOLID CARBON DIOXIDE
Filed Aug. 1, 1930
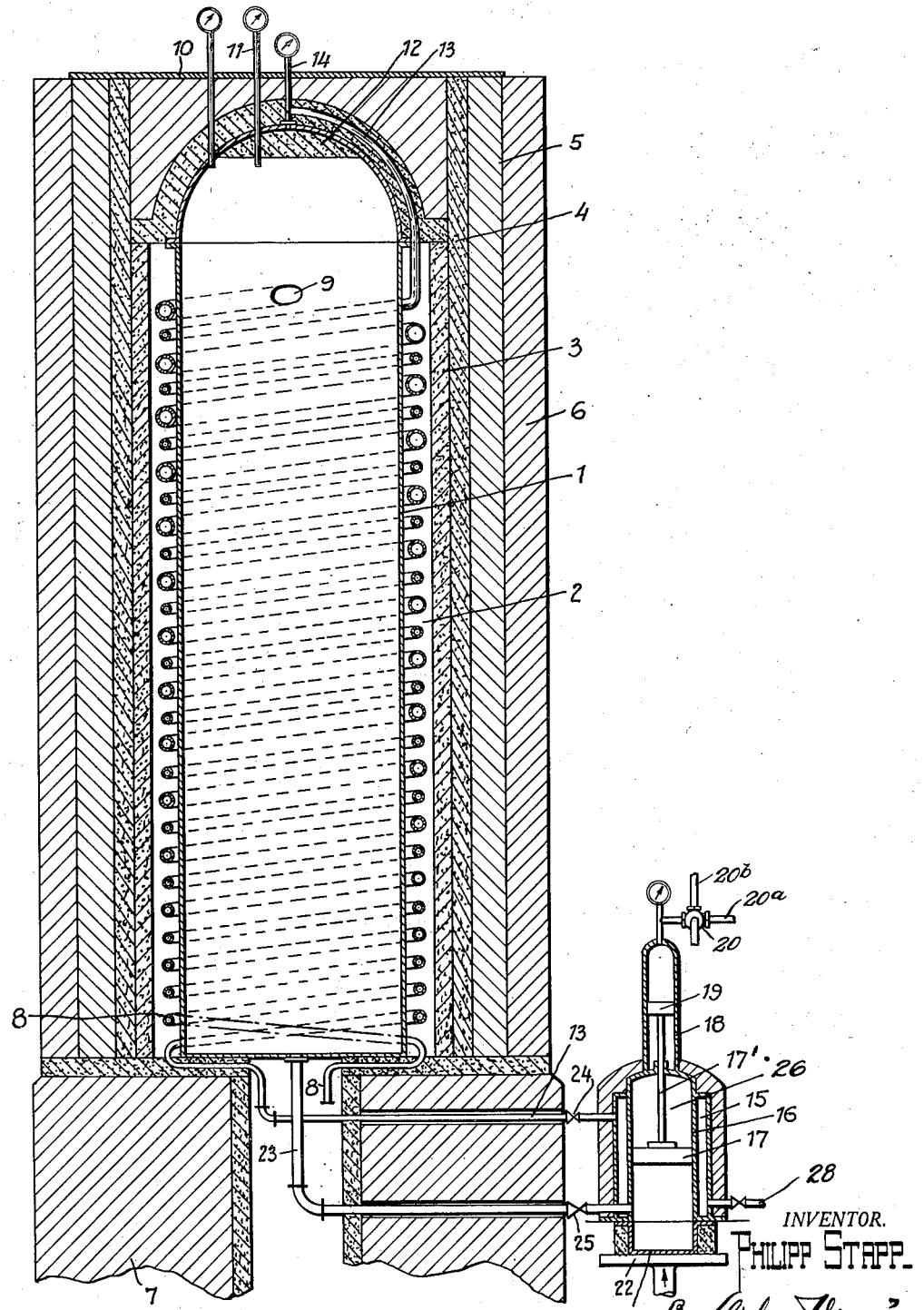

Patented Nov. 20, 1934

1,981,676

UNITED STATES PATENT OFFICE 1,981,676

APPARATUS FOR THE PRODUCTION OF SOLID CARBON DIOXIDE

Philipp Stapp, Munich, Germany

Application August 1, 1930, Serial No. 472,478
In Germany August 5, 1929

10 Claims. (Cl. 62—121)

This invention relates to the production of solidified carbon dioxide, and has generally in view to provide a novel apparatus for the production of solidified carbon dioxide in accordance with the general method set forth in my prior application, Serial Number 391,113.

According to my prior application, carbon dioxide in solidified or compact form is produced by permitting gradual expansion of liquid carbon dioxide contained within a closed vessel, exceptional density of the "ice" thus being obtained due to the avoidance of formation of carbon dioxide "snow" and by reason of the triple point (the state in which a substance can exist at one and the same time as a gas, a liquid and a solid) pressure and temperature developing automatically.

The general object of my present invention is to provide an apparatus for the economical quantity production of solid carbon dioxide in accordance with the foregoing general method and certain improvements therein, and in cake or block form of such sizes and shapes as may be desired.

With the foregoing and various other objects in view, which will become more fully apparent as the nature of the invention is better understood, the same consists in the provision of an apparatus embodying such novel features of construction, combination and arrangement of parts as will be hereinafter more fully described, illustrated in the accompanying drawing and defined in the appended claims.

In the accompanying drawing the single figure is a vertical sectional view through one practicable embodiment of an apparatus for the production of solid carbon dioxide in accordance with the invention.

Referring to the drawing in detail, it will be observed that the apparatus includes, essentially, a receptacle or receiver, designated as 1, of preferably cylindrical shape, vertically disposed and surrounded by a chamber 2, outwardly of which is an effective heat insulation structure composed, for example, of an inner layer 3 of glass wool, a layer 4 of flaked charcoal, a layer 5 of flaked cork and an outer retaining wall 6 of brick or the like. The receptacle and the insulation structure are supported upon a suitable heat insulating base 7 which cooperates with the insulating layers 3, 4, 5 and 6 and the receptacle to close the chamber 2 at or near the bottom of the receptacle. The receptacle preferably is of dome shape at its upper end and covered by suitable heat insulation material 10 which cooperates with the insulating layers 3, 4, 5 and 6 to close the chamber 2 at or near its upper end, said chamber being coextensive or substantially coextensive with the cylindrical portion of the receptacle.

A pipe 8 for the supply of liquid carbon dioxide to the receptacle 1 extends through the base 7 and is coiled about the receptacle within the chamber 2 in upwardly directed spiral form, said pipe being of progressively or intermittently increasing diameter towards its upper end and at said end being in communication with the receptacle near the upper end of the latter as indicated at 9.

Communicating with the top of the receptacle 1 through a small orifice formed therein is a pressure gage pipe 14, and connected with this pipe is a gas escape pipe 13 which extends downwardly into the chamber 2 and within said chamber is coiled about the receptacle in downwardly directed spiral form, the turns or coils of this pipe 13 being disposed in heat exchange relationship to the receptacle and to the coils or turns of the pipe 8 between the coils or turns of the latter.

One or more safety valves or pressure relief devices, designated generally as 11, is or are provided for the escape of any excessive pressure which may tend to develop within the receptacle 1.

At a suitable point exterior with respect to and lower than the receptacle 1 is disposed a cylinder 16 which is closed at its upper end and open at its lower end and which is surrounded by a chamber 15 covered by suitable heat insulating material. The gas escape pipe 13 extends through the base 7 and is connected with this chamber 15 near the upper end thereof, there being a control valve 24 interposed in said pipe at a suitable readily accessible point between said chamber and base 7. Similarly, a pipe 23 extends from the bottom of the receptacle 1 through the base 7 and is connected with the cylinder 16 near the lower end of the latter, this pipe 23, like the pipe 13, having a control valve 25 interposed therein at a readily accessible point between base 7 and cylinder 16.

Connected with the chamber 15 near the bottom thereof is a gas escape pipe 28 which leads to any suitable heat exchange device (not shown) and subsequently to any suitable gas holder or compressor (not shown) where the gas is adapted to be condensed for return in liquid form through the pipe 8 to the receptacle 1, the latter pipe preferably being connected with the heat exchange device whereby the liquid carbon dioxide flowing therethrough to the receptacle 1 is initially precooled by gas escaping from the receptacle by way of the pipe 28.

Reciprocal within the cylinder 16 between the lower open end and a point near the top thereof is a piston 17 having a piston rod 17' which extends upwardly through the top of said cylinder into a cylinder 18 where it is provided with a piston 19. Connected with the top of the cylinder 18 through a valve 20 is a pair of pipes 20a and 20b, one for the admission of any suitable fluid under pressure into said cylinder above the piston 19 for the purpose of forcing the piston 17 downwardly in the cylinder 16 and the other for the exhaust of fluid from said cylinder above the piston 19 to cause said piston to rise in said cylinder with consequent rising of the piston 17 in the cylinder 16. The pipes 20a, 20b are connected with any suitable pressure and suction sources, respectively, and the valve 20 is operable to connect either pipe to the exclusion of the other with the top of the cylinder 18 whereby reciprocation of the piston 17 may be effected. Obviously, any other suitable means may be provided to reciprocate the piston 17.

The piston 17 either is formed of suitable porous material or is provided with suitable valve means or with small apertures, or is fitted sufficiently loosely within the cylinder 16, to permit the passage of carbon dioxide gas upwardly therethrough or therearound from the bottom portion of said cylinder to the top portion thereof, but regardless of the means provided for such passage of said gas, the means is such as to permit only a slow or gradual gas passage whereby the formation of carbon dioxide crystals is avoided. Similarly, the cylinder 16 may be formed of porous or permeable material or, equivalently, may be provided with small apertures 26 in the top portion thereof so that gas passing upwardly from the bottom of the cylinder 16 through or around the piston 17 to the top of the cylinder may escape from the cylinder through the porous or permeable wall thereof or through the apertures 26 in said wall, as the case may be, into the chamber 15 for flow with the gas entering said chamber through the pipe 13 to the heat exchange device and the compressor or gas holder (not shown) by way of the pipe 28. Alternatively, instead of providing for the gradual flow of gas from the bottom of the cylinder 16 through or around the piston 17 to the top of the cylinder and thence into the chamber 15, the cylinder may be formed of suitable porous material or may have small openings formed therein for the direct passage of gas from the cylinder below the piston into the chamber 15.

Adapted for cooperation with the lower open end of the cylinder 16 is a cup-like vessel 21 which is suitably heat insulated and closed at its sides and bottom and open at its top as shown. This vessel is carried by or supported upon a suitable base or platform 22 which may be raised to bring the flanged top of vessel 21 into liquid tight engagement with the flanged bottom of the cylinder 16 to cause the vessel to constitute a temporary closure for the lower open end of the cylinder, and, as is obvious, said vessel may be of any size and shape desired within the limits determined by the diameter of the cylinder 16, the vessel constituting a mold in which the cake or block of solidified carbon dioxide is adapted to be formed. In this connection it is apparent that by placing a cup-like jacket member of insulating or other material in the vessel 21 before the same is raised to a closing position with respect to the lower open end of the cylinder 16, said jacket may, upon the subsequent lowering of the vessel with the formed block of carbon dioxide therein, be removed from the vessel with the block to remain as an insulating packaging or covering element for the block.

The operation of the apparatus, assuming the receptacle 1 to contain a quantity of liquid carbon dioxide at or slightly above the triple point and the valve 25 to be closed, is as follows: The vessel 21 containing or not containing a cup-like packaging or covering element, as may be desired, is raised into closing relation to the open bottom of the cylinder 16 and the valve 25 then is opened to permit a desired amount of liquid carbon dioxide to flow from the receptacle 1 into the lower end of the cylinder 16 and the vessel 21. The valve 25 then is closed the piston 17 by its own weight pressing on the carbon dioxide contained in the vessel 21 and the lower end of the cylinder 16. Slow or gradual expansion of the carbon dioxide is permitted by the provision for gradual escape of gas from the vessel 21 and the cylinder 16 into the chamber 15, and as this slow or gradual expansion continues over a suitable period of time the liquid carbon dioxide first reaches the triple point if not already at that point when it is introduced into the cylinder 16 and then congeals and assumes an exceptionally dense, solid form, assisted by the pressure exerted thereon by the piston 17, which is now forced downward by the fluid under pressure admitted to the top of cylinder 18, and presses the block of solidified carbon dioxide thus formed either wholly or partially into the vessel 21 for subsequent removal from the latter in any suitable manner following lowering of the vessel. The gas escaping from the cylinder 16 into the chamber 15 mixes with the gas flowing to said chamber from the receptacle 1 through the pipe 13 and by reason of said gas passing, in its travel to the pipe 28, through the chamber 15 which surrounds the cylinder 16, advantage is taken of the cooling effect of the same on the liquid carbon dioxide contained within the cylinder to promote the solidification thereof. At the same time, due to the heat exchange relationship of the coils of the pipes 8 and 13, the advantage is taken of the cooling effect of the gas escaping from the receptacle 1 through the pipe 13 to cool the liquid carbon dioxide being supplied to the receptacle through the pipe 8. Moreover, in this connection, due to the gradually increasing diameter or capacity of the carbon dioxide supply pipe 8 towards its outlet end, gradual expansion of the carbon dioxide flowing through said pipe to the receptacle 1 is permitted which results in a further lowering of the temperature of the liquid carbon dioxide as it nears the receptacle. While, of course, liquid carbon dioxide from any desired source may be supplied to the receptacle 1, the preferred arrangement is, as previously stated, to provide a closed system in which the pipe 28 leads first to a heat exchanger to which the pipe 8 is connected, and thence to a gas holder or compressor for the condensing of the gas and its return by way of the heat exchanger and the pipe 8 to the receptacle 1, such additional supply of carbon dioxide as may be required to compensate for that drawn off from the tank 1 to the cylinder 16 and the vessel 21 being introduced into the system in any suitable manner.

After the piston 17 has been forced downwardly to press the formed block of solidified carbon dioxide into the vessel 21 the valve 20 is manipulated to connect the suction pipe 20b with the top of the cylinder 18 thereby to effect raising of the pistons 19 and 17 so that the operation as set forth may be repeated.

Regarding the escape of carbon dioxide gas from the receptacle 1 through the pipes 14 and 13, it is obvious that said pipes, instead of being connected with each other and only one of them being in direct communication with the receptacle, may have separate connections with the receptacle. However, this would entail the provision of more than a single gas outlet orifice in the top of the receptacle which is avoided by the arrangement shown. Moreover, in this connection it will be observed that there is provided within the receptacle, in underlying relation to the gas outlet orifice therein, a pad or cushion 12 of suitable material through which the gas is required to pass in its flow to the pipe 13, said pad or cushion being of such a nature as to retard the flow of the gas and thus prevent the forming of crystals which otherwise might enter and clog the pipe 13.

From the foregoing description considered in connection with the accompanying drawing it is believed that the essential and novel features of method and apparatus constituting the invention will be clearly understood. It is desired to point out, however, that while only a single specific embodiment of the apparatus has been herein illustrated and described, the invention obviously is readily capable of embodiment in other mechanical structures within the spirit and scope of the invention as defined in the appended claims.

I claim:

1. Apparatus for the production of solidified carbon dioxide comprising a container into which liquid carbon dioxide is adapted to be admitted, a piston movable within said container to exert a compressive pressure on the carbon dioxide contained within said container, said piston being constructed to permit the escape of gas from said container at such a slow rate as to cause the carbon dioxide within the container to assume a dense solid form, said container being adapted to receive a jacket-member of insulating material acting as a covering for the block of solid carbon dioxide.

2. Apparatus for the production of solidified carbon dioxide comprising a container into which liquid carbon dioxide is adapted to be admitted, a piston movable within said container to exert a compressive pressure on the carbon dioxide contained within said container, said piston being constructed for the escape of gas from the side thereof facing the liquid into the container at the side of the piston remote from the liquid and at such a slow rate as to cause the carbon dioxide within the container to assume a dense solid state, means providing a chamber outside of and in heat exchanging relation to said container, and means for the flow of the escaping gas from the container into said chamber.

3. In apparatus for the production of solidified carbon dioxide, a storage receptacle for liquid carbon dioxide, a pipe for the supply of liquid carbon dioxide to said receptacle, a pipe for the escape of carbon dioxide gas from said receptacle, and means for the drawing off of liquid carbon dioxide from said receptacle and converting of the same into solidified form, said liquid supply and gas escape pipes being coiled spirally about said receptacle with the coils of each pipe disposed between adjacent coils of the other pipe.

4. In apparatus for the production of solidified carbon dioxide as set forth in claim 3, the connection of the gas escape pipe with the top of the receptacle and the spiral coiling of the same downwardly around the receptacle, and the upwardly directed spiral coiling of the liquid supply pipe around the receptacle and the connection of the latter pipe with the receptacle near the top thereof.

5. In apparatus for the production of solidified carbon dioxide, a storage receptacle for liquid carbon dioxide, a pipe for the supply of liquid carbon dioxide to said receptacle, a pipe for the escape of carbon dioxide gas from said receptacle, and means for the drawing off of liquid carbon dioxide from said receptacle and converting of the same into solidified form, said liquid supply pipe being of gradually increasing cross sectional area towards its point of connection with the receptacle.

6. In apparatus for the production of solidified carbon dioxide, a storage receptacle for liquid carbon dioxide, means for the drawing off of liquid carbon dioxide from said receptacle and converting the same into solidified form, a pipe connected with the top of said receptacle for the escape of carbon dioxide gas therefrom, and means within said receptacle covering the point of communication of said pipe with the receptacle and serving to retard the escape of gas from the receptacle to such a low rate as to avoid the formation of crystals.

7. In apparatus for the production of solidified carbon dioxide, a storage receptacle for liquid carbon dioxide, a container, means for the supply of liquid carbon dioxide from said receptacle to said container, means providing a chamber exteriorly of said container disposed in heat exchanging relation thereto, means for the escape of gas from said container into said chamber at such a slow rate as to cause the carbon dioxide contained within the container to assume a dense solid state, and means for the escape of gas from said receptacle into said chamber.

8. Apparatus for the production of solidified carbon dioxide comprising a container to receive liquid carbon dioxide, a piston movable within said container to exert a compressive pressure on carbon dioxide therein, the container being formed of material having such porosity or permeability as to permit escape of gas therefrom at such a slow rate as to cause carbon dioxide therein under the influence of the pressure exerted thereon by the piston to assume a dense solid form.

9. Apparatus for the production of a solidified carbon dioxide comprising a container to receive liquid carbon dioxide, a piston movable within said container to exert a compressive pressure on carbon dioxide therein, the container being constructed to permit escape of gas therethrough at such a slow rate as to cause carbon dioxide therein under the influence of the pressure exerted thereon by the piston to assume a dense solid form.

10. Apparatus for the production of solid carbon dioxide comprising, in combination, a receptacle for liquid carbon dioxide, a vertically disposed container below said receptacle, said container being open at its bottom, a removable closure for the open bottom of said container, a piston within said container, a valve controlled pipe connecting the bottom of said receptacle with the lower end portion of said container for supplying liquid carbon dioxide by gravity flow to the container below the piston when the bottom of the container is closed, and means for the escape of gas from the container below the piston to the container above the piston at such a slow rate that the carbon dioxide within the container below the piston congeals into dense solid form.

PHILIPP STAPP.